(12) United States Patent
Kuhn

(10) Patent No.: US 7,997,550 B2
(45) Date of Patent: Aug. 16, 2011

(54) MOUNT FOR CARRYING AT LEAST ONE DISPLAY DEVICE

(75) Inventor: Peter Kuhn, Munich (DE)

(73) Assignee: Mavig GmbH, Munich (DE)

( * ) Notice: Subject to any disclaimer, the term of this patent is extended or adjusted under 35 U.S.C. 154(b) by 1129 days.

(21) Appl. No.: 10/504,641

(22) PCT Filed: Jan. 14, 2003

(86) PCT No.: PCT/EP03/00310
§ 371 (c)(1),
(2), (4) Date: Jun. 20, 2005

(87) PCT Pub. No.: WO03/069215
PCT Pub. Date: Aug. 21, 2003

(65) Prior Publication Data
US 2005/0230584 A1    Oct. 20, 2005

(30) Foreign Application Priority Data
Feb. 13, 2002  (DE) .................................. 102 05 869

(51) Int. Cl.
*E04G 3/00* (2006.01)

(52) U.S. Cl. ............. 248/276.1; 248/278.1; 248/280.11; 248/298.1; 248/448; 248/447.1; 248/917; 248/919; 248/921

(58) Field of Classification Search .............. 248/276.1, 248/278.1, 280.11, 298.1, 448, 447.1, 917, 248/919, 921; 361/681, 682
See application file for complete search history.

(56) References Cited

U.S. PATENT DOCUMENTS

| | | | |
|---|---|---|---|
| 2,672,312 A * | 3/1954 | Drueding | 248/181.2 |
| 3,596,863 A * | 8/1971 | Kaspareck | 359/871 |
| 3,911,221 A | 10/1975 | Wong | |
| 4,397,439 A | 8/1983 | Wilbur et al. | |
| 4,489,910 A * | 12/1984 | Ferguson | 248/219.4 |
| 4,953,821 A | 9/1990 | Reuter et al. | |
| 5,009,384 A * | 4/1991 | Gerke et al. | 248/343 |
| 5,108,063 A | 4/1992 | Koerber, Sr. et al. | |
| 5,165,644 A * | 11/1992 | Allen | 248/285.1 |
| 5,597,147 A | 1/1997 | Hashi | |
| 5,621,927 A * | 4/1997 | Reiss et al. | 4/559 |
| 5,687,939 A * | 11/1997 | Moscovitch | 248/122.1 |
| 5,904,328 A * | 5/1999 | Leveridge et al. | 248/124.1 |
| 6,343,006 B1 * | 1/2002 | Moscovitch et al. | 361/681 |
| 6,435,461 B1 * | 8/2002 | Saylor et al. | 248/231.71 |
| 6,466,432 B1 * | 10/2002 | Beger | 361/681 |
| 6,554,238 B1 * | 4/2003 | Hibberd | 248/278.1 |
| 6,568,836 B2 * | 5/2003 | Wahl | 362/404 |

(Continued)

FOREIGN PATENT DOCUMENTS
DE    40 03 992 A1    8/1991
(Continued)

*Primary Examiner* — Nkeisha J Smith
(74) *Attorney, Agent, or Firm* — Scully, Scott, Murphy & Presser, P.C.

(57) ABSTRACT

The invention relates to a mount (A) for holding at least one display device, comprising a first mounting arm (1) which has an essentially vertical mounting arm segment (1a) and at least one second mounting arm (2) which extends essentially in a horizontal direction across from the mounting arm segment (1a) of the first mounting arm and is provided with at least one connecting element connecting said second mounting arm to the device (B). In order to improve the mount (A) so as to better position the at least one mounting location for the at least one display device (B), at least one side wall of the second mounting arm (2) is shaped in a converging manner.

6 Claims, 7 Drawing Sheets

U.S. PATENT DOCUMENTS

| | | | |
|---|---|---|---|
| 6,639,789 B2 * | 10/2003 | Beger | 361/681 |
| 6,739,096 B2 * | 5/2004 | Feldpausch et al. | 52/36.1 |
| 6,742,754 B1 * | 6/2004 | Maier-Hunke et al. | 248/441.1 |
| 6,782,649 B1 * | 8/2004 | Adler | 40/734 |
| 6,796,541 B2 * | 9/2004 | Lu | 248/291.1 |
| 6,844,865 B2 * | 1/2005 | Stasko | 345/1.3 |
| 6,863,252 B2 * | 3/2005 | Bosson | 248/278.1 |
| 6,892,650 B2 * | 5/2005 | Baloga et al. | 108/50.01 |
| D507,270 S * | 7/2005 | Ozolins et al. | D14/375 |
| 7,061,754 B2 * | 6/2006 | Moscovitch | 361/679.21 |
| 7,065,811 B2 * | 6/2006 | Newkirk et al. | 5/600 |
| 7,210,662 B2 * | 5/2007 | Liou et al | 248/282.1 |
| 2003/0141425 A1 * | 7/2003 | Obdeijn | 248/317 |
| 2003/0231460 A1 * | 12/2003 | Moscovitch | 364/681 |
| 2004/0011938 A1 * | 1/2004 | Oddsen, Jr. | 248/393 |
| 2004/0041062 A1 * | 3/2004 | Ozolins et al. | 248/122.1 |
| 2004/0195471 A1 * | 10/2004 | Sachen, Jr. | 248/127 |
| 2005/0146845 A1 * | 7/2005 | Moscovitch | 361/681 |
| 2005/0178937 A1 * | 8/2005 | Liang | 248/278.1 |
| 2006/0113436 A1 * | 6/2006 | Parsons | 248/125.7 |
| 2006/0175498 A1 * | 8/2006 | Tarone et al. | 248/276.1 |
| 2006/0238967 A1 * | 10/2006 | Carson et al. | 361/681 |
| 2007/0097609 A1 * | 5/2007 | Moscovitch | 361/681 |
| 2007/0205340 A1 * | 9/2007 | Jung | 248/125.9 |

FOREIGN PATENT DOCUMENTS

| | | |
|---|---|---|
| DE | 196 17 809 A1 | 11/1997 |
| DE | 200 15 398 UI | 2/2001 |
| DE | 199 83 832 T1 | 11/2001 |
| DE | 100 43 895 A1 | 7/2002 |
| JP | 2000112375 | 4/2000 |
| JP | 2000184311 | 6/2000 |
| WO | WO 01/45627 A1 | 6/2001 |
| WO | WO03/000091 A2 | 1/2003 |

* cited by examiner

MOUNT FOR CARRYING AT LEAST ONE DISPLAY DEVICE

BACKGROUND

The invention relates to a mount for carrying at least one display device, in particular a flat screen unit.

A mount of this type is described in the non-prepublished DE 100 43 859 A1. This mount is equipped to position a plurality of visual display units in a room, said units being disposed in a horizontal row, the mount being suspended on a mounting device by an articulation with a horizontal pivot axis, said mounting device being mounted on the ceiling of a room. A horizontally extending mounting arm serves to carry the visual display units which are disposed in the horizontal row, said mounting arm being mounted centrally on the lower mounting arm portion of a C-shaped first mounting arm, the upper mounting arm portion of which is connected to the articulation. The distinctive C-shape of the first mounting arm makes it possible to dispose a conventional visual display unit with a large rear structure in the region of the first mounting arm. Because of the arrangement of a plurality of visual display units in a transverse row, a rotated arrangement of the visual display units relative to each other is required in order to be able to see them well with respect to a common viewing point, e.g. an operations desk, and to be able to see the images of the screens as far as possible without parallax and image distortion. As a result, a considerable complexity with respect to operational complexity and working time and also considerable assembly and mounting costs are prescribed since particular adjustment devices must be provided between the visual display units and the second mounting arm in order to be able to implement the particular adjustments of the visual display units.

SUMMARY

One exemplary aspect of the invention is to improve a mount of the initially indicated type with respect to a favourable room positioning of the mounting site for the at least one display device.

In the embodiment according to the invention, the at least one second mounting arm has a concave shape in the horizontal with respect to the front side, and in fact preferably has such a shape that the mounting arm portions, which are disposed in the region of the respective mounting site, extend approximately at right angles to a vertical plane in which the visual axis of the respective device extends. In the case of the embodiment according to the invention, the view of the display device or devices is optimal because it lies in the respective visual axis and therefore image distortions produced e.g. because of parallax are avoided or at least reduced.

The embodiment according to the invention makes it possible to have positioning and connecting elements, which are for example able to be premanufactured, on the mounting arm side and effective in a form-fitting manner and which position the display device or devices respectively in a correct position. The respectively mounted display device is located thereby because of the concave shape of the second mounting arm essentially in the respective visual axis without a special orientation of the display device being necessary, as is the case in the state of the art. Since any position for a mounting site is suitable in the case of a curved second mounting arm, it is possible to displace these in steps or continuously.

In the case of an existing mount, the course and the laying of the electrical wires extending to the at least one display device are problematic and indeed both with respect to their arrangement and also their mounting and accessibility.

Furthermore, another exemplary aspect of the invention is to improve a mount of the initially indicated type with respect to the course of the electrical wires. This applies to the approximately vertical mounting arm portion and/or to the second mounting arm extending transversely thereto. In particular an improvement in the arrangement and mounting is sought. Furthermore, an improvement in the accessibility and subsequent inspection of the cables is sought.

In the embodiment according to the invention, the approximately vertical mounting arm portion and/or the second mounting arm extending transversely thereto is formed respectively by a U-profile, the free space of which forms a cable channel and is closed by a cover strip which is retained detachably on one or on both members of the U-profile. As a result, a simple construction is prescribed because no particular channel must be produced, instead the mounting arm configured as a U-profile is made use of as a cable channel. Because of the available three-sided covering of the cable channel, merely a covering of the fourth side is required, which is effected in a simple manner by a cover strip which is retained detachably on one of the two members of the U-profile. As a result, a simple and economically produceable construction is also provided, which can be produced simply and economically because of the profile shape and detachability of the cover strip or can be retrofitted also with electrical wires or respectively enables inspection thereof.

For adequate covering of the cable channel or respectively channels, a mounting of the cover strip on one or on both members of the U-profile is required. A longitudinal groove, preferably on the inside of one or both members of the U-profile, is suitable as positioning means for the cover strip, the cover strip being able to be inserted longitudinally into the at least one groove. In order to position the cover strip in its longitudinal direction, a mounting element, which is effective in a form-fitting and/or frictional manner, can be disposed on the U-profile, which element is formed for example by a screw engaging through a member in a threaded hole, which screw can be clamped against the cover strip or engages in a hole of the same.

The above-described embodiment, having at least one groove for positioning the cover strip, is suitable both for a linearly extending mounting arm and for an arcuately curved mounting arm. In the latter case, flexibility or a correspondingly curved shape of the cover strip is required in order to be able to insert it into the at least one groove.

An existing mount is retained displaceably in many cases, e.g. by an articulation on a mounting device which can be mounted on the ceiling of a room.

Furthermore, yet another aspect of the invention is to configure a mount of the initially indicated type such that improved manual gripping and movement is possible.

In the case of the embodiment according to the invention, the mount has a handle under the second mounting arm which extends forwards preferably from the first mounting arm portion.

This embodiment makes manual gripping of the mount possible, on the one hand, from the front side and, on the other hand, in its central region so that it can be moved in a manageable manner. The handle is configured preferably in the sense of a two-handed operation and can have two handles at a horizontal spacing from each other for a two-handed operation. In a preferred embodiment, the two handles are formed by two e.g. horizontally and linearly extending handle rods which protrude on both sides of a rod-shaped, handle mount which extends forwards from the first mounting arm portion and protrudes forwards preferably beyond the second mounting arm.

In such cases, in which a mounting device for the mount has at least one brake for establishing one degree of freedom of the mounting device, it is advantageous to provide a switch for switching-off and switching-on of at least one brake in the region of the at least one handle. As a result, a manageable switching-off and switching-on of the brake is possible.

According to the embodiments of the invention, features are described for preferably adjustable mounting of the at least one display device and/or at least one additional display device and/or protective rods for protecting the at least one display device. These further features also lead to a simple, compact and stable construction with a small dimension between the front side and rear side of the mount.

BRIEF DESCRIPTION OF THE DRAWINGS

Advantageous embodiments of the invention are explained subsequently in more detail with reference to several embodiments. There are shown in the drawing:

FIG. 5 the detail characterised in FIG. 2 with V in enlarged sectional representation;

Figure 1:
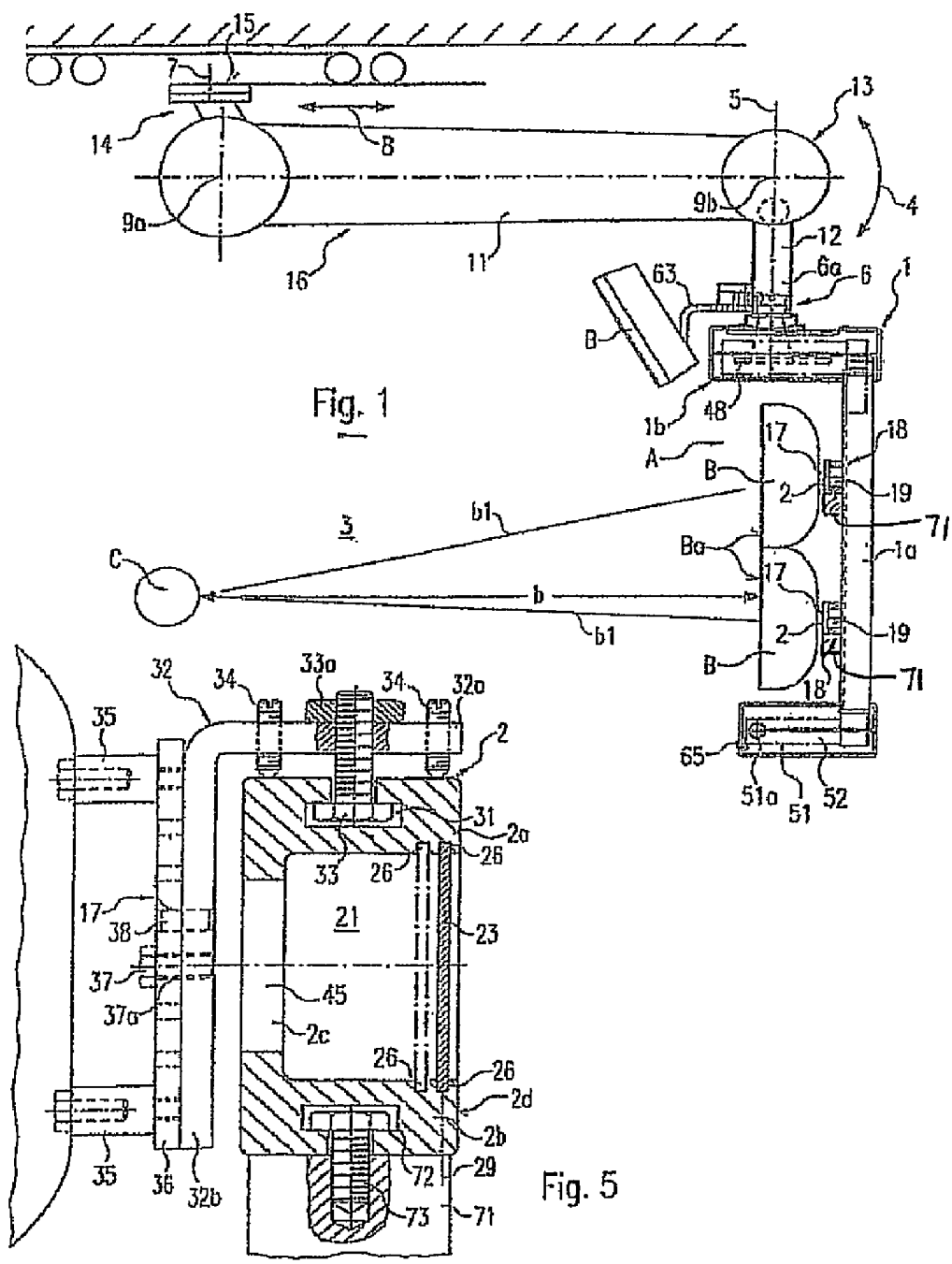
FIG. 1 a mount according to the invention in side view, said mount being suspended on a ceiling mounting device.
Figure 2:
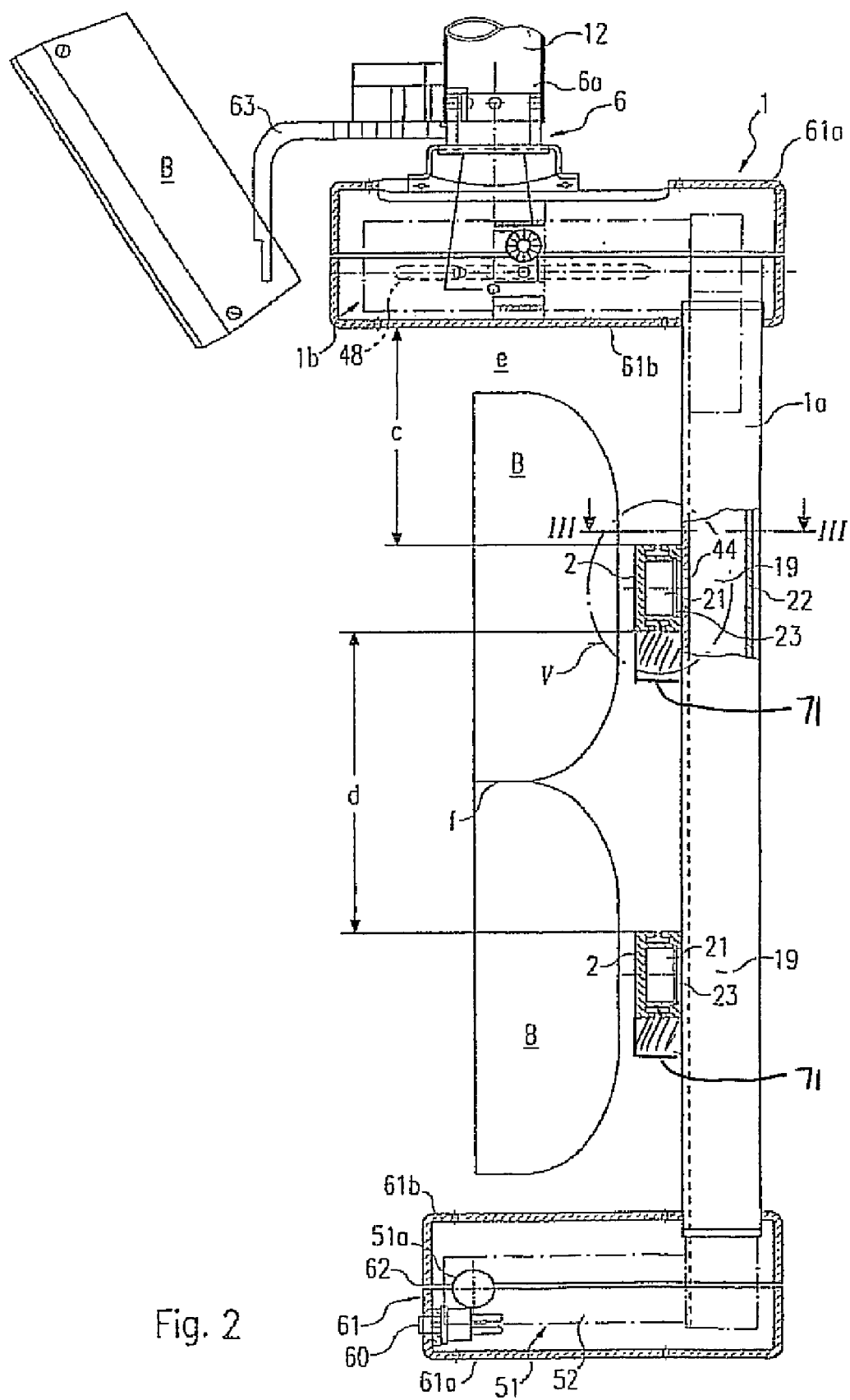
FIG. 2 the mount in enlarged side view.
Figure 4:
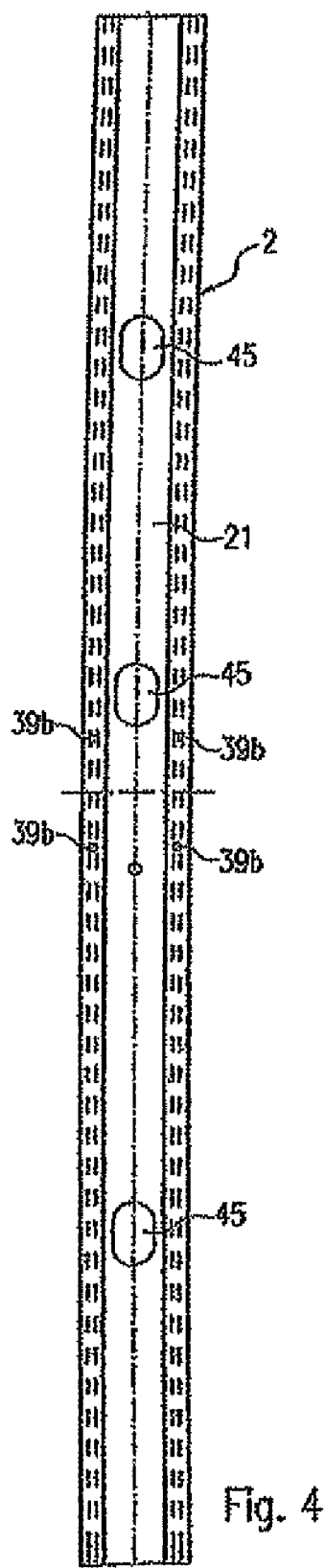
FIG. 4 a second mounting arm in rear view.

The mount designated with A in its entirety for carrying at least one display device B, in particular for carrying at least one flat screen unit, is provided for the purpose of positioning the display device or devices B readily visibly with respect to a viewing point C disposed in the present room 3 so that one or more persons located in the region of the viewing point C can easily see the at least one device B.

In the embodiment, the mount A is vertically adjustable according to the double arrow 4 and/or freely rotatable about a first vertical axis of rotation 5 in a rotary articulation 6 and/or is pivotable about a second vertical line and a second vertical axis of rotation 7 which is disposed at a horizontal spacing from the first axis of rotation 5 and/or is displaceable to and fro in a horizontal direction according to the double arrow 8 such that the spacing b from the viewing point C can be reduced or increased optionally.

A lifting arm 11, which is pivotable about a horizontal pivot axis 9a, serves for the vertical adjustment, on the free end of which lifting arm a retainer 12 is mounted pivotably about a pivot axis 9b, which is disposed at a horizontal spacing from the pivot axis 9a, in an articulation 13. The preferably weight-equalising lifting arm 11 is in addition connected rotatably about the second vertical axis of rotation 7 to a slide 15 by an articulation 14, said slide being displaceable to and fro along the double arrow 10 in a guide, e.g. in a roller guide. In the embodiment, the mounting device 16 designated with 16 in its entirety is mounted on the ceiling of the present room 3. It can however also be supported differently, e.g. on a side wall of the room 3.

The mount A has an angular shape with an angular mounting arm 1 having an essentially vertically extending rear mounting arm portion 1a and an upper mounting arm portion 1b, the upper mounting arm portion 1b extending towards the front side of the mount 1 orientated towards the viewing point C. The rotary articulation 6 is disposed between the upper mounting arm portion 1b and the retainer 12 which is pendulum-shaped in the embodiment. The vertical axis of rotation 5 extends in the central region of the upper mounting arm portion 1b. The at least one display device B is mounted detachably at its rear side by a detachable connecting device 17 to an approximately horizontally extending second mounting arm 2 which is connected by a preferably likewise detachable connecting device 18 to the front side of the mounting arm portion 1a. The mounting arm portion 1a and the second mounting arm 2 are formed respectively by a U-profile, the hollow space of which forms a cable channel 19, 21 which is open to the rear side and is closed by a detachably connected cover strip 22, 23.

The second mounting arm 2 has a convex shape towards the front side, preferably curved, in particular curved in the shape of an arcuate portion. The mounting arm 2 extending transversely relative to the vertical mounting arm plane E is preferably disposed symmetrically with respect to the mounting arm plane E and configured to be so long that a plurality of mounting sites 24, which are disposed horizontally next to each other, is disposed for respectively one display device B. The convex shape or curvature is configured such that the mounting arm portion located at the respective mounting site 24 is disposed approximately at right angles to a line of vision b1 extending linearly between the viewing point C and the mounting site 24, which line of vision can extend approximately horizontally or can be inclined towards the viewing point C. If a plurality, e.g. two, display devices B, which are disposed one above the other, is desired, the mount A can have at least two mounting arms 2 which are configured and disposed in the prescribed sense one above the other. The connecting device 17 is preferably vertically adjustable so that the associated display device B is connected to the mounting arm 2 correspondingly in a vertically adjustable manner. The vertical spacing c between the upper mounting arm portion 1b and the upper mounting arm 2 is of such a dimension that a safety spacing e is present between the display device B and the mounting arm portion 1b. This applies preferably also to a vertical spacing f between two display devices B, which are disposed one above the other, the spacing d of the mounting arms 2, which are disposed one above the other, being dimensioned to be correspondingly large.

Figure 3:
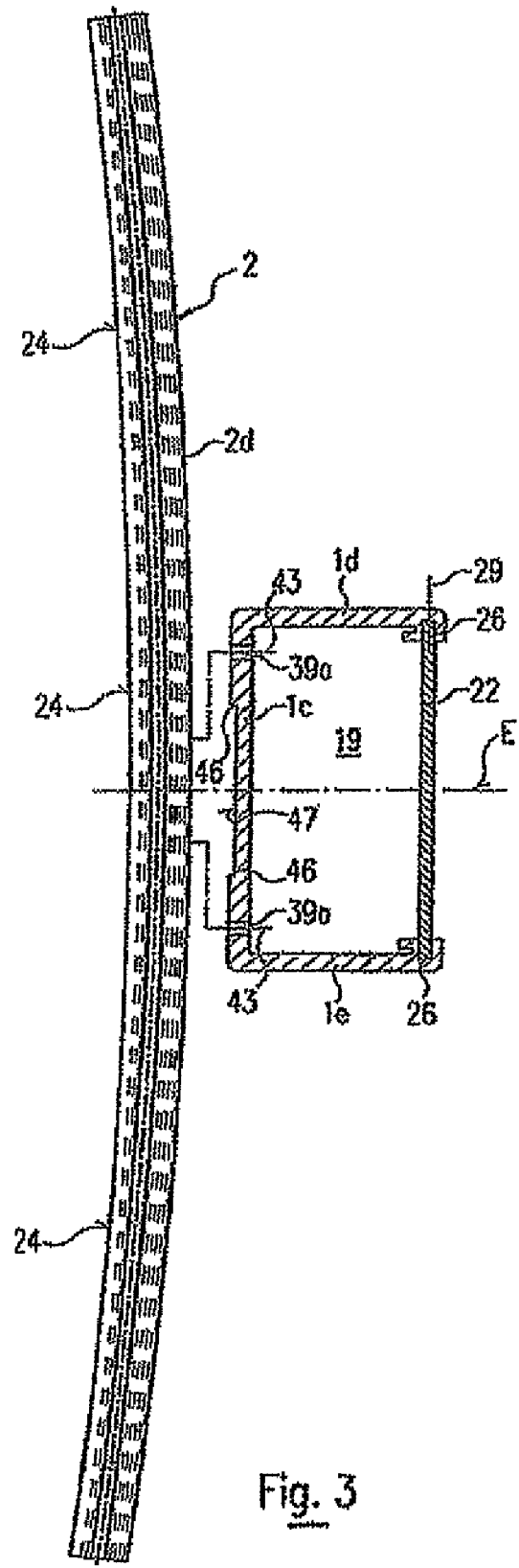
FIG. 3 the partial section III-III in FIG. 2 with a second mounting arm in plan view.
Figure 6:
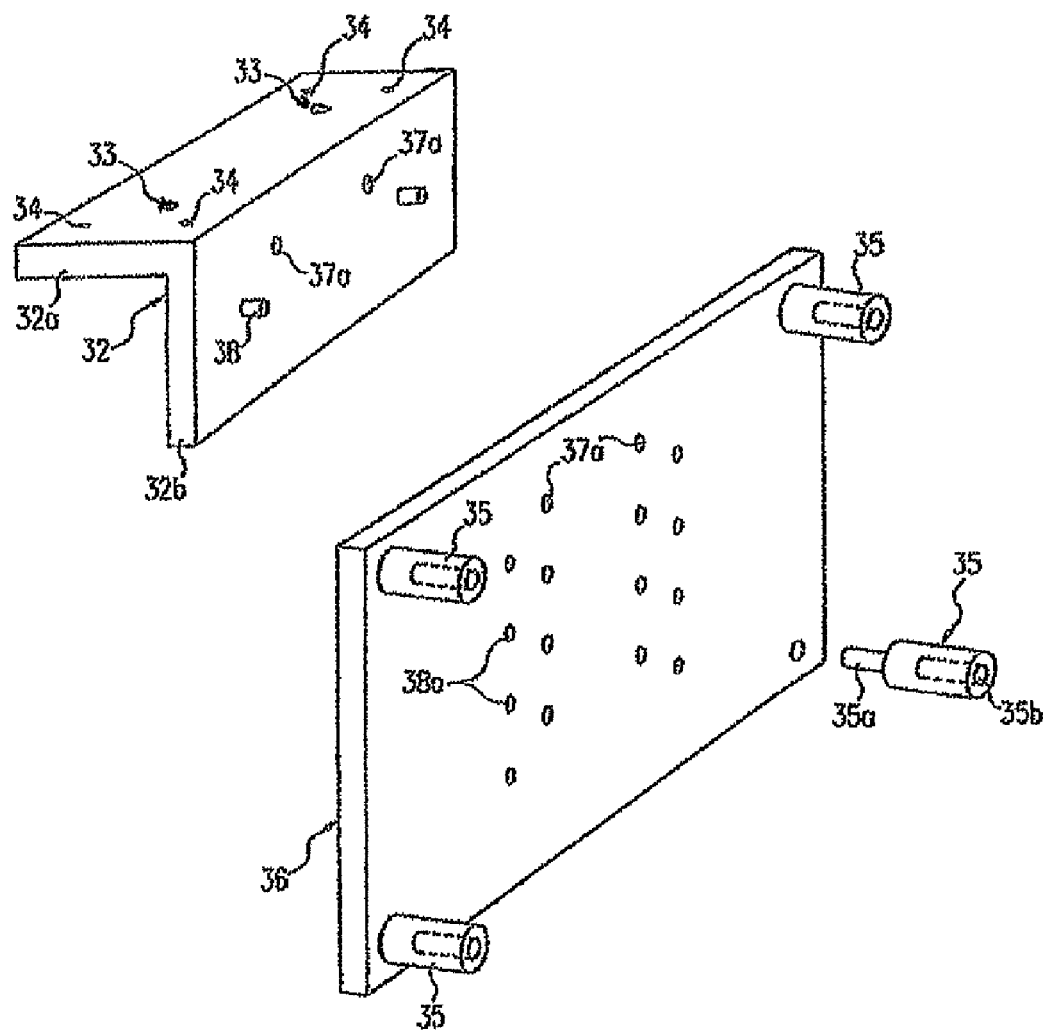
FIG. 6 individual parts of an adapting device according to FIG. 5.
Figure 7:
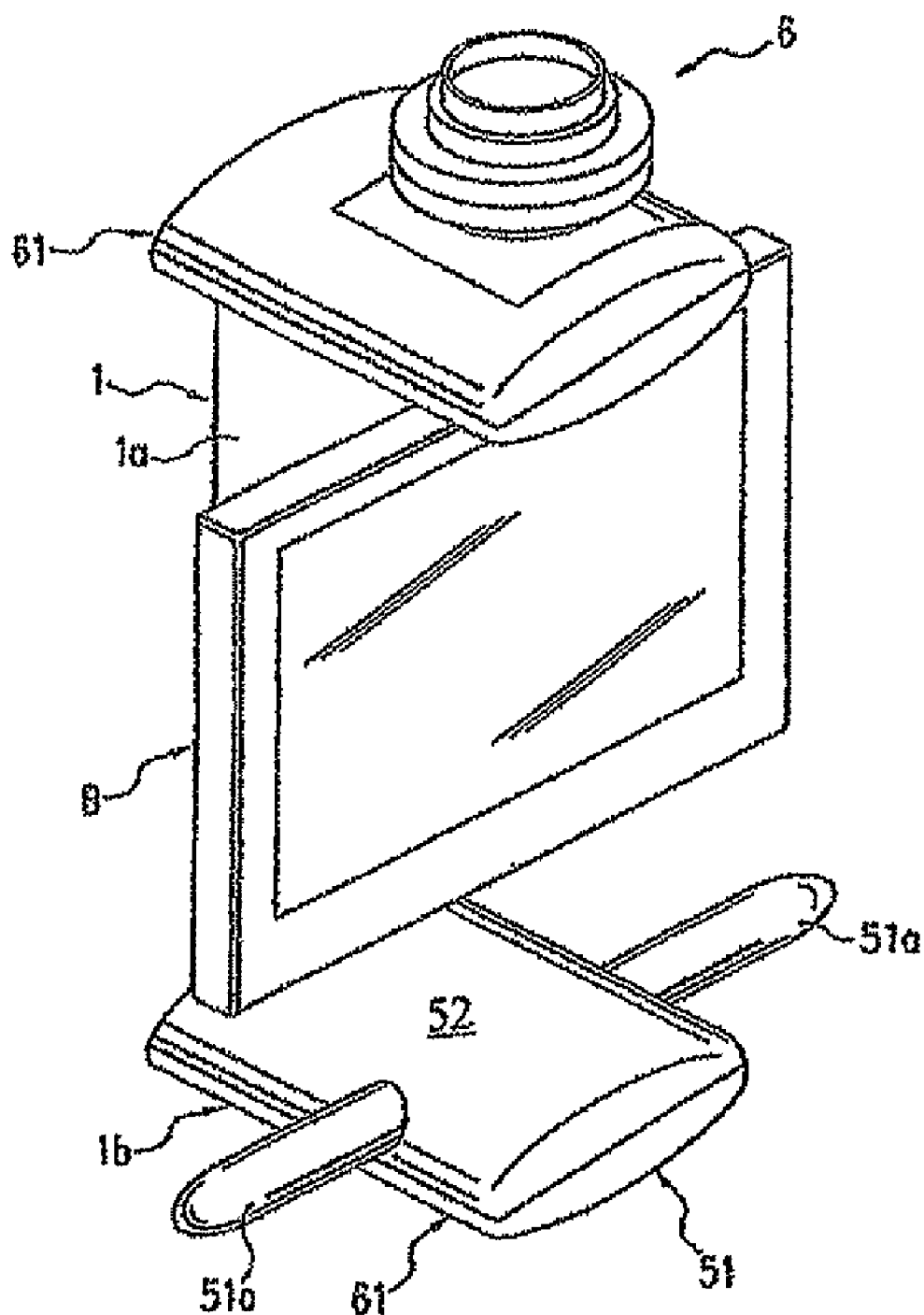
FIG. 7 an embodiment of the mount with a visual display unit in perspective representation.
Figure 8:
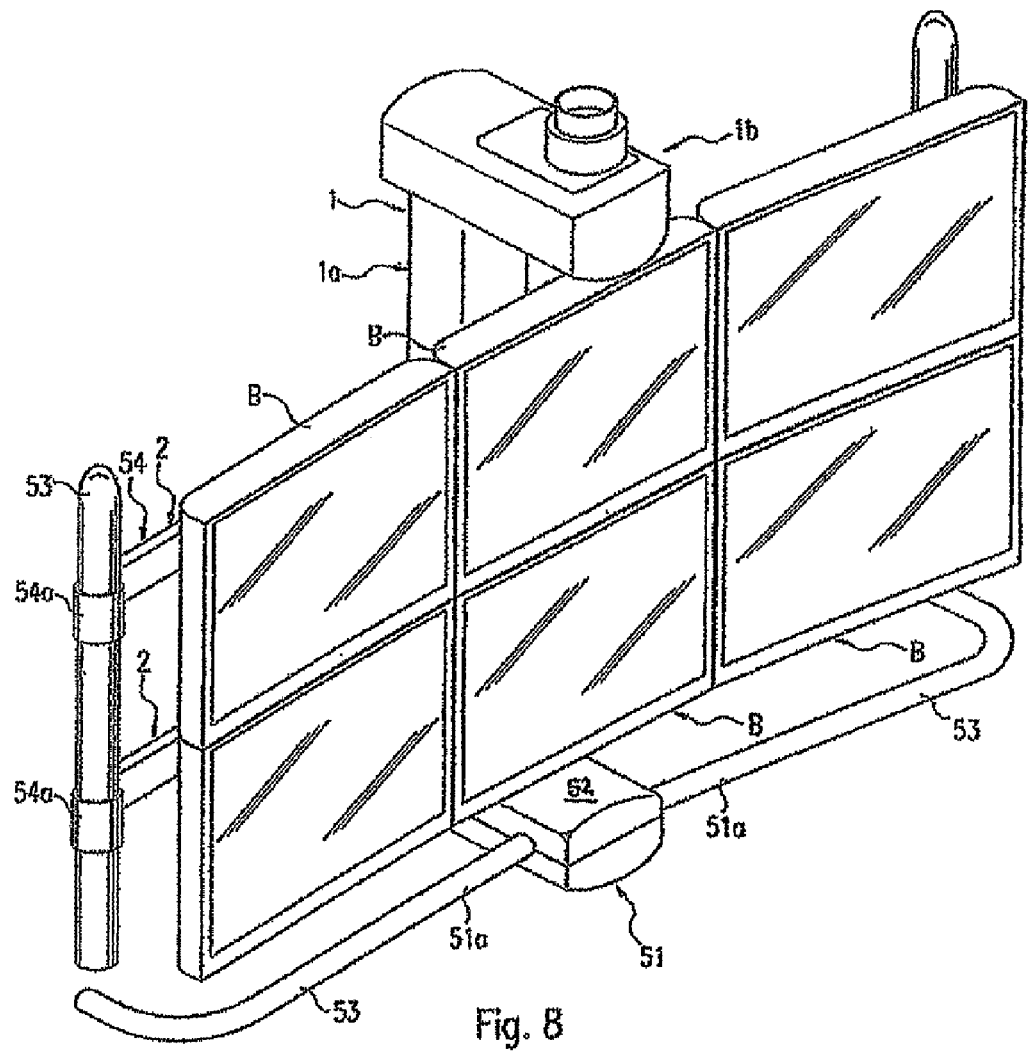
FIG. 8 an embodiment of the mount with a plurality of visual display units, which are disposed one above the other and/or one next to the other, in perspective representation.

As is evident in particular from FIGS. 3 and 5, the cover strips 22, 23 are retained respectively to be longitudinally insertable in a groove 26, which strips are disposed in the edge region of the oppositely situated members 1d, 1e, 2a, 2b of the relevant U-profile. In order to position the cover strips 22, 23 in opposition to an undesired displacement, a positioning element, which is effective relative to the relevant cover strip 22, 23, can be provided in one of the members, e.g. a threaded screw engaging through the member in a threaded hole, said threaded screw being illustrated indicationally and being designated with 29.

The connecting device 17 is configured preferably such that the display device B is adjustable, continuously or in steps, transversely relative to the mounting arm plane E or respectively along the mounting arm 2 and/or is vertically adjustable in steps or continuously and/or is displaceable approximately horizontally in the mounting arm plane E in steps or continuously and/or is, adaptable to display devices B with different mounting elements. In the embodiment, the connecting device 17 has a rear-cut mounting groove 31, in particular a T-groove, which extends longitudinally in the mounting arm 2, said groove preferably being disposed in the upper member 2a and being open at the top. In addition, the connecting device 17 has a profile-shaped base angle 32, the horizontal member 32a of which engages over the mounting arm 2 and which a screw 33 penetrates in a hole, the head of which screw is displaceable in the rear-cut of the mounting groove 31 and can be clamped by means of a nut 33a by tightening the screw 33.

In order to finely adjust the base angle 31 or the display device B, three or four adjustment screws 34, which are disposed distributed around the screw 33, can be disposed, said adjustment screws penetrating the member 32a in a threaded hole. By means of a more or less deep screwing-in of the adjustment screws 34 against the mounting arm 2, the base angle 31 can be positioned with respect to slight all-round positions of inclination.

For the already mentioned adjustment of the display device B along the viewing line b1, the connecting device 17 can have one or more spacers 35 of different lengths which are disposed distributed and are able to be mounted respectively between two connecting parts of the connecting device 17, e.g. between the display device B and the approximately vertical member 32b of the base angle 32 or an adapting plate 36 which is disposed therebetween and is connectable to the spacers 35 and the member 32b. The above-mentioned vertical adjustment device can be formed in that, in the member 32b and/or in the adapting plate 36, lead-through holes 37a are in at least one or two vertical rows, into which mounting screws 37, illustrated only in FIG. 5, can be introduced for the purpose of vertical step adjustment. Screw lead-through holes 37a and pin lead-through holes 38 can be provided for stabilisation, pins 38, which engage through both parts and are tight-fitting for example in one of these parts being able to be introduced at different vertical positions.

The spacers 35 can have for example tapered screw bolts 35a at one end and screw holes 35b at the other end.

The connecting device 18 can be a screw connection with lead-through holes 39a in the web 1c of the mounting arm portion 1a and threaded holes 39b in the members 2a, 2b of the mounting arm 2 into which mounting screws 43, which are illustrated indicationally, engage. In FIG. 3, the mounting arm portion 1a is represented enlarged and at a spacing from the mounting arm 2 for reasons of clarity.

One or more lead-through holes 44 for the cables are disposed for the passage of the non-illustrated cables between the cable channels 19, 21, in the web 1c of the vertical mounting arm portion 1a respectively at the height of the second mounting arm 2 according to the number of mounting arms 2 which are disposed one above the other. In the web 2c of the mounting arm or arms 2, lead-through hole(s) 45 is or are disposed in the region of the mounting site or sites 24 of the display device or devices B for leading through the cables to the devices 8.

In order to ensure a stable support of the curved rear side 2d of the mounting arm 2 on the front side of the mounting arm portion 1a, the mounting arm portion 1a has two vertical support edges 46 which have a horizontal spacing from each other and can be formed by a vertical groove 47 in the front side of the mounting arm portion 1b. The depth and/or width of the groove 47 is preferably dimensioned such that the curved rear side 2d abuts not only against the support edges 46 but preferably also against the base of the groove 47.

In order to enable horizontal displacement of the centre of gravity S of the mount 1 with respect to the articulation 6, the retainer-side articulation part 6a is horizontally displaceable in its longitudinal direction with respect to the upper mounting arm portion 1b. For example a horizontal adjustment groove 48 can serve for this purpose, which groove is disposed preferably in the mounting arm portion 1b and into which the articulation part 6a engages with a preferably horizontally, longitudinally configured engagement element. Such an adjustment device is the subject of DE 100 43 859 A1, reference to which is made in its entirety so that further description can be dispensed with here.

For manual movement of the mount 1 on or with the mounting device 16, a handle 51 is provided which is disposed at the lower end of the mounting arm portion 1a or protrudes forwards from the lower end, preferably protrudes so far that it is located under the front side of the at least one display device B. In the embodiment, a handle rod 52 extends forwards from the mounting arm portion 1a, a handle 51a projecting on one or on both sides respectively in the front end region of said handle rod, on which handle or handles the mount 1 can be moved in the suspension single-handedly or two-handedly in a manageable manner, e.g. in order to align the at least one device B with the viewing point C.

Figure 9:
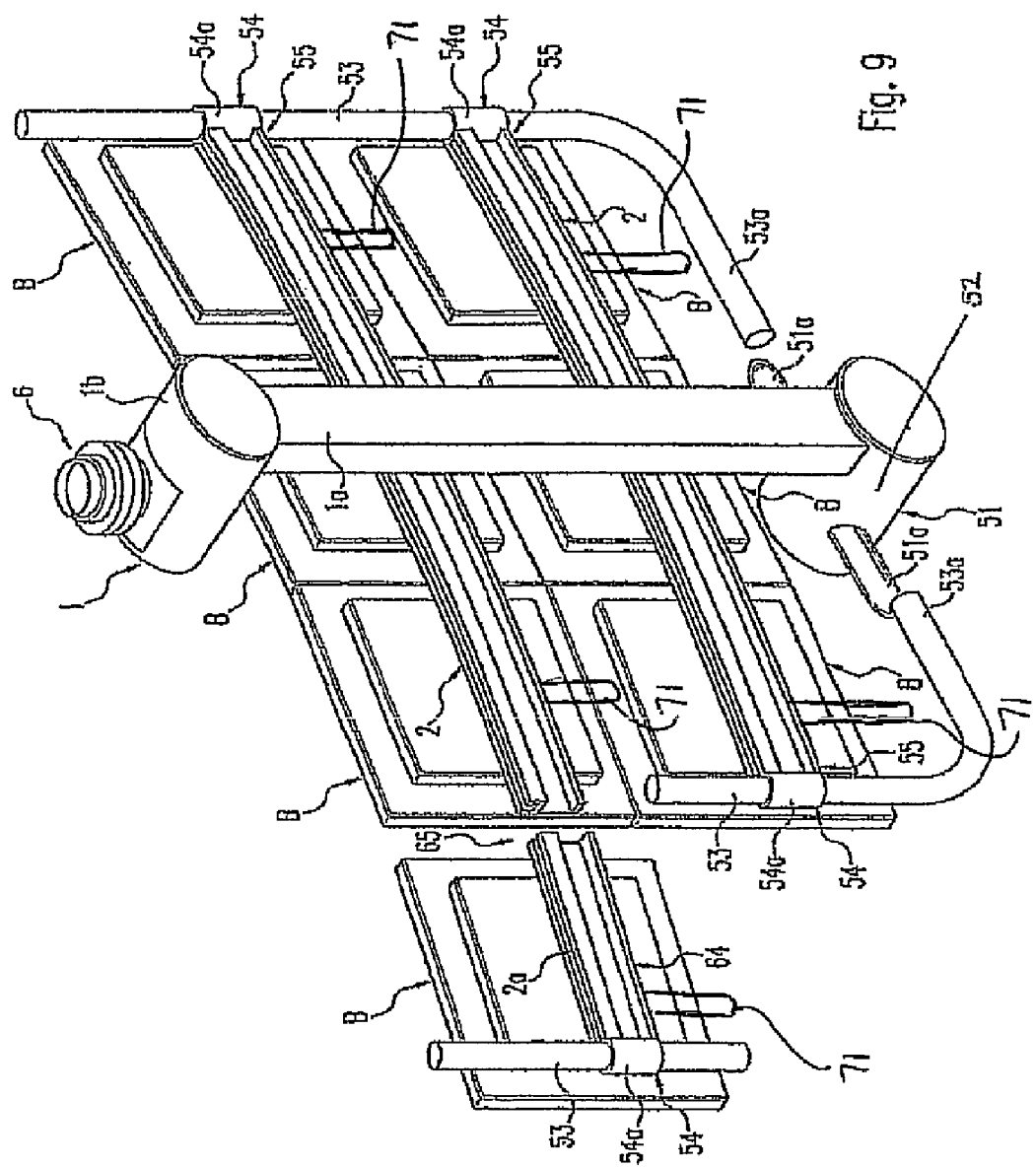
FIG. 9 the mount according to FIG. 8 in perspective rear view in a modified embodiment.

In order to protect the device or devices B at their edges, e.g. from impact during movement, the mount 1 can have impact rods 53 extending at least at the lateral edges, said impact rods being able to be carried by the second mounting arm or arms 2 and being able to be connected to the latter. In the embodiment, the impact rods 53 are formed by tubes which are retained respectively on at least one impact rod holder 54 which can be mounted respectively at the associated end of the mounting arm 2, e.g. by a plug-in connection 55 and can be connected to the latter. In the embodiment, the impact rod holder 54 has vertically disposed pipe pieces 54a, into which the associated impact rod 54 is insertable with movement clearance and is lockable by a locking means, e.g. a clamping screw screwed transversely into the associated pipe piece 54a. The impact rods 53, with angle extensions 53a extending on the lower and/or upper edge, can serve also for protecting the lower and/or upper edge. In the embodiments, the handles 51a are disposed in the vicinity of the lower edge or the lower edges of the at least one device B at such a spacing therefrom that they can be gripped in a manageable manner and can form at the same time impact rods for this lower edge. If a plurality of devices B is disposed next to each other, the handles 51a can be extended corresponding to the length of the edge which is produced in total. These impact rods 53 can thereby have a convergent or curved shape corresponding to the convergent shape of the front sides of the devices B. In the embodiment according to FIG. 9, the free end regions of these impact rods are angled-over or bent-over downwards.

The upper mounting arm portion 1b and/or the handle 51 or the handle rod 52 and/or the rear mounting arm portion 1a can be covered by half-shell-shaped cover parts 61a, 61b which abut against each other with respect to the upper mounting arm portion 1b and the handle 51 on horizontal or vertical separating joints 62 (not shown).

The mount 1 can have additional mounting arms 63, 64 for additional display devices B, by which, in the embodiment according to FIG. 1, a mounting arm 63 can be mounted on the upper mounting arm portion 1b or on the retainer 12 and can engage angularly for example over the front end of the upper mounting arm portion 1b and can carry on its front or lower end an additional display device B, preferably in a position tilting forwards. In the embodiment according to FIG. 9, an additional display device B is retained in the previously described manner on an extension piece 2a of a mounting arm 2, here of the upper mounting arm 2. The extension piece 2a can be connected to the mounting arm 2 for example by a plug-in connection 65 which can be plugged together in the longitudinal direction of the mounting arm 2. The lateral edge of the additional device B can likewise be protected in the previously described manner by an impact rod 53 connected to the extension piece 2a. The connection piece or pieces connecting the impact rod 53 or the impact rod holder 54 respectively to the mounting arm 2 is disposed displaced so far forwards with respect to the grooves for the cover strip 23 that the grooves are open at the side and the cover strip 23 can be inserted into the grooves behind the respective connecting part and be withdrawn again from the latter.

In order to stabilise the mounting device 16 respectively in its adjusted position, it is advantageous to assign a non-illustrated brake to at least one motion or one degree of freedom. In the embodiment, such a brake can be assigned to the rotary articulation 14 and/or to the slide 15. In order to switch such a brake off and on for manual movement of the mount 1 by manual engagement on the handle 51 in a manageable manner, a switch element 65 is disposed in the region of the handle 51, e.g. integrated into the cover 61, upon manual actuation of which the brake can be switched off and on. The actuation element 65 is disposed preferably at such a spacing from one of the handles 51a that it can be actuated in a manageable manner when gripping with one finger of the operating hand. The associated electrical circuit for controlling the brake can be configured such that the brake is switched off upon actuating the switch element 65 and is switched on again upon ending the actuation of the switch element 65. For two available brakes, two switch elements 65 can be provided in a corresponding manner in the region of the handle 51.

It is advantageous to configure the mount 1 with the display device or devices B such that its centre of gravity is situated in the vertical central plane E. If this is not the case, equalising weights are assigned to the mount 1, which weights can be fixed on one side on the mount 1 with respect to the vertical plane E. In the case where the lateral impact rods 53 are formed by tubes, an equalising weight can be formed in that the relevant impact rod 53 is filled at least partially with an equalising weight. Another advantageous possibility resides in mounting an equalising weight 71 (FIG. 5) on the mounting arm 2 or on one of the mounting arms 2, preferably disposing it displaceably in its longitudinal direction so that the operating spacing of the equalising weight 71 is adjustable continuously. In the embodiment, the at least one mounting arm 2 has a second rear-cut groove 72, preferably on the underside, in which the equalising weight 71 is suspended by means of a cap screw 73 introduced into the groove 72, and is optionally displaceable.

Since the horizontal mounting arms 2 can have a significant length, it is advantageous for closing the cable channel 21 to dispose at least two grooves 26 next to each other, into which grooves cover strip pieces 23 are inserted, the length of which is shorter than the length of the associated mounting arm 2. For example two or three cover strip pieces 23 can be provided, the length of which is approximately one half or one third of the mounting arm length and which preferably overlap a little in the closed state when disposed offset relative to each other.

The invention claimed is:

1. A mount for carrying at least one display device, comprising: a first mounting arm comprising a mounting arm portion which extends substantially vertically, said mounting arm portion comprising a front side and a rear side; at least one second mounting arm, the second mounting arm comprising a front side and a rear side, the rear side of the second mounting arm mountable to the front side of the mounting arm portion of the first mounting arm, the second mounting arm extending substantially longitudinally and oriented substantially horizontally to be transverse to the mounting arm portion of the first mounting arm, the second mounting arm comprising a concavely curved mounting arm portion along a curvature which is oriented away from the mounting arm portion of the first mounting arm, the second mounting arm comprising a first groove formed in a vertically upper side of the second mounting arm; and at least one connecting part connectable to the at least one display device, the at least one connecting part being fastenable to the second mounting arm through latching engagement with the first groove; wherein the mounting arm portion of the first mounting arm comprises two vertical support edges formed on the front side of the mounting portion of the first mounting arm, the two vertical support edges spaced from each other to define a second groove extending vertically between the two vertical support edges, the second groove comprising a base extending between the two vertical support edges, the concavely curved portion of the second mounting arm being configured to abut against the two vertical support edges and the base of the second groove; an equalizing weight disposed on the second mounting arm to be displaceable along a length of the second mounting arm.

2. The mount according to claim 1, wherein the mount comprises a plurality of connecting parts fastened to the second mounting arm in mutually spaced relationship for connection to a plurality of display devices.

3. The mount according to claim 1, wherein the mount comprises a plurality of connecting parts fastened to the second mounting arm in mutually spaced relationship for connection to a plurality of display devices.

4. The mount according to claim 1, wherein the mount comprises a plurality of second mounting arms mounted on the mounting arm portion of the first mounting arm in vertically spaced arrangement relative to each other.

5. A mount for carrying at least one display device, comprising: a first mounting arm comprising a mounting arm portion which extends substantially vertically, said mounting arm portion comprising a front side and a rear side; at least one second mounting arm, the second mounting arm comprising a front side and a rear side, the rear side of the second mounting arm mountable to the front side of the mounting arm portion of the first mounting arm, the second mounting arm extending substantially longitudinally and oriented substantially horizontally to be transverse to the mounting arm portion of the first mounting arm, the second mounting arm comprising a concavely curved mounting arm portion along a curvature which is oriented away from the mounting arm portion of the first mounting arm, the second mounting arm comprising a first groove formed in a vertically upper side of the second mounting arm; and at least one connecting part connectable to the at least one display device, the at least one connecting part being longitudinally displaceably fastenable to the second mounting arm through latching engagement with the first groove; wherein the mounting arm portion of the first mounting arm comprises two vertical support edges formed on the front side of the mounting portion of the first mounting arm, the two vertical support edges spaced from each other to define a second groove extending vertically between the two vertical support edges, the second groove comprising a base extending between the two vertical support edges, the concavely curved portion of the second mounting arm being configured to abut against the two vertical support edges and the base of the second groove; an equalizing weight disposed on the second mounting arm to be displaceable guidable along a length of the second mounting arm; wherein the mount is a portion of a mounting device which is mountably suspended from a ceiling or supportable on a wall of a structure.

6. The mount according to claim 5, wherein the mount comprises a plurality of second mounting arms mounted on the mounting arm portion of the first mounting arm in vertically spaced arrangement relative to each other.

* * * * *